United States Patent [19]

Eimerman, Jr. et al.

[11] Patent Number: 5,513,978
[45] Date of Patent: May 7, 1996

[54] QUICK ATTACH ANCHOR AND METHOD FOR ATTACHING DECORATIONS TO WREATHS

[75] Inventors: John P. Eimerman, Jr., Pewaukee; Alice Hildebrandt, Glidden; Dan Hildebrandt, Fifield, all of Wis.

[73] Assignee: Cayuga Industries, Inc., Menomonee Falls, Wis.

[21] Appl. No.: 255,407

[22] Filed: Jun. 8, 1994

[51] Int. Cl.⁶ .................................................. A01G 5/00
[52] U.S. Cl. ........................... 428/10; 428/17; 24/711.1; 47/41.01
[58] Field of Search ......................... 428/10, 17; 223/104; 52/166, 163; 47/41.12, 41.01; 24/711.1, 710.4, 90 B, 609

[56] References Cited

U.S. PATENT DOCUMENTS

| | | | |
|---|---|---|---|
| 114,504 | 5/1971 | Young | 24/90 B |
| 683,655 | 10/1901 | Mersch | 24/90 B |
| 2,645,833 | 7/1953 | Wistedt | 24/711.1 |
| 3,110,647 | 11/1963 | Tong | |
| 3,819,458 | 6/1974 | Kinderman et al. | |
| 4,100,316 | 7/1978 | Lackey | |
| 4,574,539 | 3/1986 | Deike | 52/166 |

FOREIGN PATENT DOCUMENTS

| | | | |
|---|---|---|---|
| 1027038 | 5/1953 | France | 428/10 |
| 1281734 | 10/1968 | Germany | 47/55 |

Primary Examiner—Henry E. Raduazo
Attorney, Agent, or Firm—Reinhart, Boerner, Van Deuren, Norris & Rieselbach

[57] ABSTRACT

An anchor having a tapered shape is attached to a decoration, such as a pine cone, by way of wires or strings. The anchor is then inserted into the front of a wreath, narrow end first, through the branches making up a wreath, until the branches lie between the anchor's wider end and the decoration. The branches prevent the wider end of the anchor from being easily withdrawn through the wreath, and thus keep the decoration attached to the wreath.

5 Claims, 1 Drawing Sheet

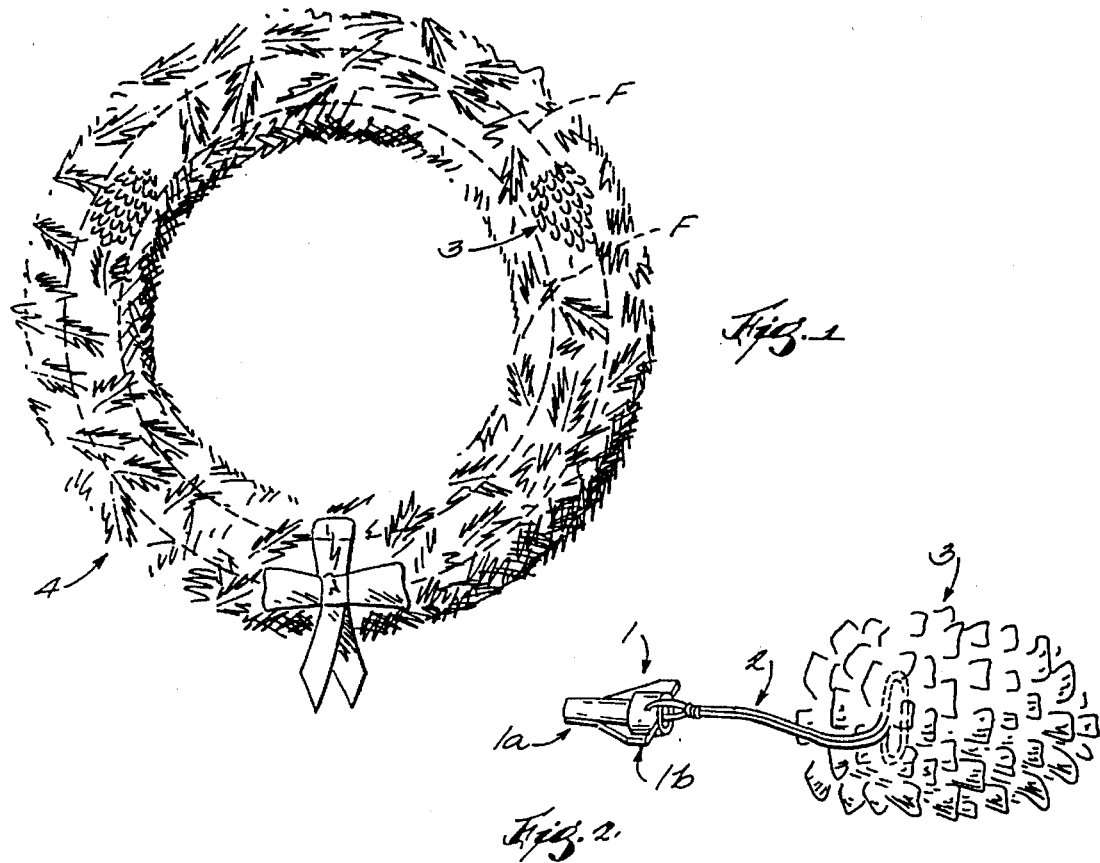
Fig. 1
Fig. 2
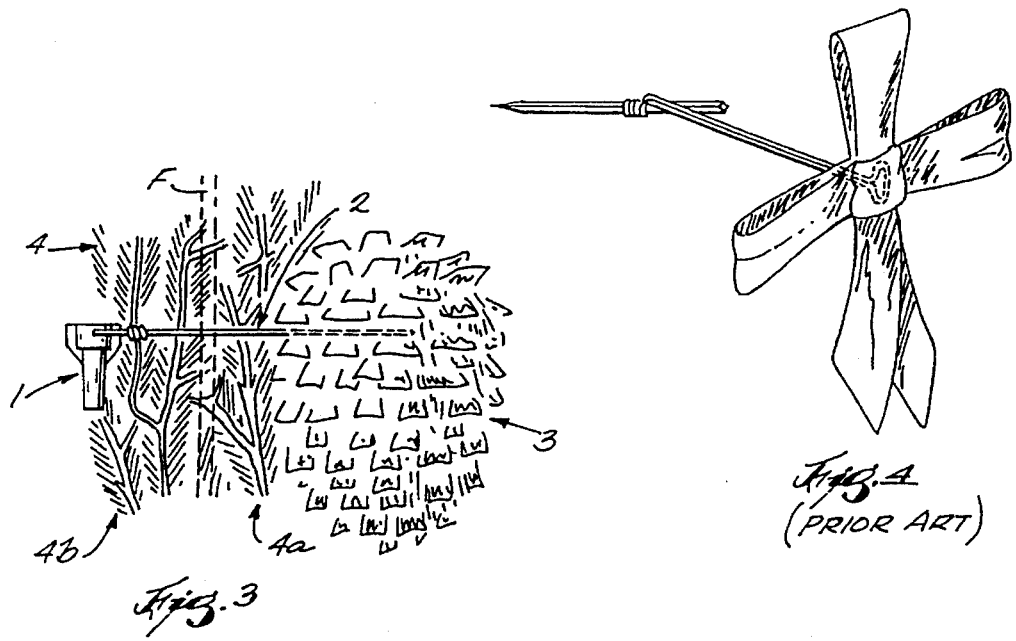
Fig. 3
Fig. 4
(PRIOR ART)

QUICK ATTACH ANCHOR AND METHOD FOR ATTACHING DECORATIONS TO WREATHS

BACKGROUND OF THE INVENTION

This invention relates generally to wreaths and, more particularly, to methods of attaching decorations to such wreaths.

Decorations, such as pine cones and ribbons, have long been attached to wreathes of evergreen branches. Originally, the decorations were held to the evergreen branches by means of wires or strings. The wires or strings were first wrapped around or tied to the decoration, and then wrapped around or tied to either the branches, or to the frame on which the branches were mounted to form the wreath. This method of attaching decorations to a wreath holds the decorations securely, but is time-consuming and involves considerable manual labor. In the modem marketplace, the difficulty of this method of attachment often results in higher turnover among assembly workers, thus increasing training time and the resultant overhead incurred by the wreath manufacturer.

The business of manufacturing wreathes is labor-intensive, and cost sensitive. To reduce the time spent by wreath-makers on attaching decorations, an alternative attachment method was once developed that included the use of a stick. In the alternative method, the decorations were attached to pointed sticks, and the sticks were then inserted into the wreath's branches. This method was much faster than the original technique, but did not connect the decorations as securely to the wreath. The sticks to which the decorations were attached often slid out from among the wreath's branches as easily as they slid in. The insecurity of the "stick" method of attachment is particularly problematic in the modem marketplace, where wreaths are often assembled in a single manufacturing location and then shipped to a widely dispersed group of retail outlets. To avoid the duplication of effort caused by insecure attachment methods that often require retailers to reattach decorations to wreaths upon receipt at a retail outlet, modem wreath decorations must be capable of remaining attached to a wreath throughout extensive shipping and handling.

SUMMARY OF THE INVENTION

The invention provides an apparatus and method for attaching decorations to wreaths comprising a tapered anchor having a wider end to which a decoration is attached by a tether, and a narrower end to be used as the leading end when inserting the anchor into a wreath. The narrow end is narrower than the average space between the branches of a wreath. The anchor's taper is gradual enough to allow the anchor to move the wreath's branches apart as it is inserted, enabling passage of the wide end, without great exertion by the wreath assembler. The wide end of the anchor is wider than the average space between the branches of a wreath, so that the anchor will not easily pass through that space if an attempt is made to withdraw the anchor from the wreath.

It is a general object of the present invention to provide a new and improved anchor and method for attaching decorations to wreaths.

It is a further object of the present invention to provide a new and improved anchor and method for attaching decorations to wreaths that allows swift and easy insertion of the attachment apparatus into a wreath's branches.

It is a further object of the present invention to provide a new and improved anchor for attaching decorations to wreaths that will not easily slide out from amongst a wreath's branches.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a front view of a wreath having decorations attached in accordance with various aspects of the invention.

FIG. 2 is a perspective view of an anchor embodying various features of the invention, showing the anchor attached to a decoration, in this case a pine cone, by way of a tether.

FIG. 3 is a cross sectional view of a section of a wreath having a decoration, in this case a pine cone, attached to it in accordance with one aspect of the invention.

FIG. 4 is a perspective view of one prior art attachment apparatus, a stick, attached to a decoration, in this case a bow, by way of a tether.

DESCRIPTION OF THE PREFERRED EMBODIMENT

Referring to the drawings, a wreath W formed of evergreen branches is shown in FIG. 1. The wreath comprises a plurality of branches that are mounted to a circular frame F to form a typical, annular shape. In accordance with custom, a plurality of decorations, such as pine cones and ribbons, are attached to the wreath W.

An anchor 1 for attaching a decoration, such as a pine cone 3, to a wreath 4 is shown in FIG. 2. The anchor 1, in accordance with one aspect of the invention, is easy to insert into a wreath, but difficult to withdraw. The anchor 1 is tapered, having a narrow end 1a and a wider end 1b. In practice, a twist-on wire connector or similar device can be used as the anchor 1. The taper of anchor 1 may be provided or accentuated by wings or flanges extending from the body of the anchor. The anchor 1 is preferably connected by a tether 2 to the decoration 3 that is intended to be attached to the wreath 4. In practice, a wire, rubber band or string can be used as the tether 2, and can be attached to the anchor 1 and the decoration 3 by tying, gluing, or, if the anchor 1 is a twist-on wire connector and the tether 2 is a wire, by twisting the anchor 1 onto the end of the tether 2. If the wreath 4 is intended for viewing from only one side, the tether 2 that attaches the anchor 1 to the decoration 3 is preferably of such a length that, after its attachment to both the anchor 1 and the decoration 3, the maximum separation between the anchor 1 and the decoration 3 is approximately the same distance as the distance from the front of the wreath 4a to the back of the wreath 4b. The tether 2 that attaches the anchor 1 to the decoration 3 is attached to the wider end 1b of the tapered anchor 1. The anchor 1 is preferably connected to the decoration 3 by the tether 2 prior to insertion of the entire unit (consisting of the interconnected anchor 1, tether 2 and decoration 3, as shown in FIG. 2) into the wreath 4.

The narrower end 1a of the anchor 1 serves as the leading end of the anchor when it is inserted into the wreath 4. When the worker assembling the wreath 4 is ready to attach the decoration 3, the assembled unit shown in FIG. 3 is inserted, (with the narrow end 1a of the anchor 1 leading) into the wreath 4. The anchor 1 is pushed through the gaps between individual branches making up the wreath 4. The anchor's taper enables the anchor 1 to push the branches apart, and thus allow the anchor's wider end 1b to pass between the branches. Once the anchor's wider end 1b has passed between a pair of branches, the branches return to the positions they occupied prior to being pushed apart by the anchor 1. All that remains in the space between the branches is the tether 2.

Unintended withdrawal of the anchor 1 through the spaces between the branches is resisted by the wider end 1b. The decoration 3 is thus held, by way of the tether 2 that connects the decoration 3 to the anchor 1, in close proximity to the wreath 4, and specifically to the side 4a of the wreath 4 that is intended for public viewing. Anchor 1 in turn is held, by way of the tether 2 that connects it to the decoration 3, in close proximity to the back side of the wreath 4b, which is not intended for public viewing. The preferred length of tether 2 prevents either the anchor 1 or the decoration 3 from moving too far away from its respective side of the wreath, 4b and 4a, without having to pull the object on the other end of the tether 2 through the spaces between the branches making up the wreath. While the length of the tether 2 described above is the preferred embodiment for wreaths intended to be viewed from only a single side, that length is not critical to the invention. In the event a wreath is intended to be viewed from both sides, the preferred length of the tether 2 would be approximately half the thickness of the wreath 4, so that the anchor 1 would pass only half way through the wreath 4 upon insertion, and thus would be unseen from either side.

The anchor 1 is preferably formed from molded plastic, which has the advantages of being inexpensive yet rigid, but other materials may be used. The preferred embodiment of anchor 1 is generally circular in cross-section, but other configurations are possible.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A wreath comprising:

a circular frame;

a plurality of branches mounted on said frame to form a substantially annular shape;

an anchor embedded within said plurality of branches, said anchor including a body having a narrow end pointing inwardly relative to said branches and a wider end pointing outwardly relative to said branches, said wider end including one or more branch engaging surfaces provided by barbs or wings extending from said body for engaging said branches thereby to resist withdrawal of said anchor from said branches;

a tether having a first end coupled to said anchor adjacent said wider end so that tension on said tether tends to pull said anchor in the direction of said wider end against the resisting force of said branches engaging said wider end, said tether further having a second end opposite said first end; and a decoration connected to said second end of said tether;

said anchor and said tether thereby serving to facilitate mounting of said decoration on said wreath by allowing said anchor to be pushed into said branches with said narrow end first after which said wider end of said anchor engages said branches to resist withdrawal of said anchor from said branches.

2. A wreath comprising:

a circular frame;

a plurality of branches mounted on said frame to form a substantially annular shape;

an anchor comprising a twist-on wire connector embedded within said plurality of branches, said anchor having a narrow end pointing inwardly relative to said branches and a wider end pointing outwardly relative to said branches, said wider end engaging said branches thereby to resist withdrawal of said anchor from said branches;

a tether having a first end connected to said twist-on wire connector adjacent said wider end so that tension on said tether tends to pull said anchor in the direction of said wider end against the resisting force of said branches engaging said wider end, said tether further having a second end opposite said first end; and a decoration connected to said second end of said tether;

said anchor and said tether thereby serving to facilitate mounting of said decoration on said wreath by allowing said anchor to be pushed into said branches with said narrow end first after which said wider end of said anchor engages said branches to resist withdrawal of said anchor from said branches.

3. A wreath as defined in claim 2 wherein said tether comprises a wire.

4. A wreath as defined in claim 2 wherein said decoration is a pine cone.

5. A wreath as defined in claim 4 wherein said wreath includes a plurality of said anchors, said tethers and said pine cones.

* * * * *